United States Patent
Baba et al.

(10) Patent No.: US 8,610,960 B2
(45) Date of Patent: Dec. 17, 2013

(54) IMAGE PROCESSING USING COLORIMETRIC VALUES

(75) Inventors: Kenji Baba, Kawasaki (JP); Kazushige Hatori, Saitama (JP); Hiroyuki Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 298 days.

(21) Appl. No.: 13/061,683

(22) PCT Filed: Sep. 28, 2009

(86) PCT No.: PCT/JP2009/067285
§ 371 (c)(1),
(2), (4) Date: Mar. 1, 2011

(87) PCT Pub. No.: WO2010/038880
PCT Pub. Date: Apr. 8, 2010

(65) Prior Publication Data
US 2011/0164287 A1 Jul. 7, 2011

(30) Foreign Application Priority Data
Oct. 2, 2008 (JP) ................................ 2008-257787

(51) Int. Cl.
*G06K 15/02* (2006.01)
(52) U.S. Cl.
USPC ............ 358/3.24; 358/1.9; 358/518; 382/167
(58) Field of Classification Search
None
See application file for complete search history.

(56) References Cited

U.S. PATENT DOCUMENTS

| | | | | |
|---|---|---|---|---|
| 5,740,079 | A * | 4/1998 | Shigemori et al. | 356/402 |
| 6,717,672 | B2 * | 4/2004 | Tamagawa | 356/402 |
| 7,697,167 | B2 | 4/2010 | Hatori | 358/2.1 |
| 2002/0071120 | A1 | 6/2002 | Tamagawa | 356/402 |
| 2004/0212816 | A1 * | 10/2004 | Tanabe et al. | 358/1.9 |
| 2005/0019603 | A1 | 1/2005 | Kathirgamanathan | |
| 2009/0225340 | A1 | 9/2009 | Hatori | 358/1.9 |
| 2010/0053647 | A1 | 3/2010 | Baba | 358/1.9 |

(Continued)

FOREIGN PATENT DOCUMENTS

| | | |
|---|---|---|
| CN | 1150245 A | 5/1997 |
| EP | 0732577 | 9/1996 |

(Continued)

OTHER PUBLICATIONS

European Search Report dated Jun. 5, 2012 in corresponding European Application No. 09817911.2.

(Continued)

*Primary Examiner* — Barbara Reinier
(74) *Attorney, Agent, or Firm* — Fitzpatrick, Cella, Harper & Scinto

(57) ABSTRACT

It is difficult to appropriately estimate the colorimetric values of an arbitrary patch at a desired temperature with respect to a medium containing a fluorescent whitening agent in consideration of the influence of the fluorescent whitening agent. A target temperature and media type are designated (S601, S602), patches of a plurality of colors are formed on a set medium, and a temperature immediately after fixing (second temperature), patch colorimetric values, and medium white colorimetric values are acquired (S606, S607). Medium white calorimetric values at the target temperature are generated based on the acquired medium white calorimetric values and medium white colorimetric values at a first temperature, which are acquired in advance (S608). Patch calorimetric values at the target temperature are estimated based on the generated medium white colorimetric values and patch colorimetric values.

15 Claims, 9 Drawing Sheets

(56) References Cited

U.S. PATENT DOCUMENTS

| | | | |
|---|---|---|---|
| 2010/0053652 A1 | 3/2010 | Hatori et al. | 358/1.9 |
| 2010/0053653 A1 | 3/2010 | Hatori et al. | 358/1.9 |
| 2010/0086201 A1* | 4/2010 | Muto et al. | 382/162 |
| 2011/0102821 A1 | 5/2011 | Baba | 358/1.9 |

FOREIGN PATENT DOCUMENTS

| | | |
|---|---|---|
| JP | 9-184762 | 7/1997 |
| JP | 2000-88651 | 3/2000 |
| JP | 2002-139381 | 5/2002 |
| JP | 3555706 | 8/2004 |
| JP | 2005-507330 | 3/2005 |
| JP | 3776492 | 5/2006 |
| JP | 2008-60719 | 3/2008 |

OTHER PUBLICATIONS

U.S. Appl. No. 13/061,680, filed Mar. 1, 2011 by Hiroyuki Muto, et al.

Chinese Office Action dated Mar. 25, 2013 for Chinese Appln. No. 200980139474.1, together with English translation.

\* cited by examiner

FIG. 3

STORAGE UNIT — 31, 311

| GENERATION DATA | TEMPER-ATURE | C | M | Y | K | 380[nm] | 390[nm] | ... | 780[nm] |
|---|---|---|---|---|---|---|---|---|---|
| MEDIUM WHITE | $T_t$ | 0 | 0 | 0 | 0 | 0.2628 | 0.3127 | ... | 0.7719 |
| PATCH | $T_t$ | 0 | 0 | 10 | 0 | 0.0358 | 0.0365 | ... | 0.7278 |
|  | $T_t$ | 0 | 0 | 20 | 0 | 0.0297 | 0.0318 | ... | 0.5080 |
|  | $T_t$ | 0 | 0 | 30 | 0 | 0.0258 | 0.0285 | ... | 0.5379 |
|  | ⋮ | ⋮ | ⋮ | ⋮ | ⋮ | ⋮ | ⋮ | ⋮ | ⋮ |
|  | $T_t$ | 100 | 100 | 90 | 100 | 0.0801 | 0.0882 | ... | 0.6761 |
|  | $T_t$ | 100 | 100 | 100 | 100 | 0.0730 | 0.0808 | ... | 0.7622 |

32, 312, 321, 322

| MEASURED DATA | TEMPER-ATURE | C | M | Y | K | 380[nm] | 390[nm] | ... | 780[nm] |
|---|---|---|---|---|---|---|---|---|---|
| MEDIUM WHITE | $T_{m1}$ | 0 | 0 | 0 | 0 | 0.2628 | 0.3127 | ... | 0.7719 |
|  | $T_{m2}$ | 0 | 0 | 0 | 0 | 0.2576 | 0.3086 | ... | 0.7739 |
| PATCH | $T_{m2}$ | 0 | 0 | 10 | 0 | 0.0358 | 0.0365 | ... | 0.7278 |
|  | $T_{m2}$ | 0 | 0 | 20 | 0 | 0.0297 | 0.0318 | ... | 0.5080 |
|  | $T_{m2}$ | 0 | 0 | 30 | 0 | 0.0258 | 0.0285 | ... | 0.5379 |
|  | ⋮ | ⋮ | ⋮ | ⋮ | ⋮ | ⋮ | ⋮ | ⋮ | ⋮ |
|  | $T_{m2}$ | 100 | 100 | 90 | 100 | 0.0801 | 0.0882 | ... | 0.6761 |
|  | $T_{m2}$ | 100 | 100 | 100 | 100 | 0.0730 | 0.0808 | ... | 0.7622 |

33, 323

PRESET COLORIMETRIC DATA

MEDIUM 3
MEDIUM 2

| MEDIUM 1 | TEMPER-ATURE | C | M | Y | K | 380[nm] | 390[nm] | ... | 780[nm] |
|---|---|---|---|---|---|---|---|---|---|
| MEDIUM WHITE | $T_1$ | 0 | 0 | 0 | 0 | 0.2628 | 0.3127 | ... | 0.7719 |
|  | $T_2$ | 0 | 0 | 0 | 0 | 0.2576 | 0.3086 | ... | 0.7739 |
|  | $T_3$ | 0 | 0 | 0 | 0 | 0.2640 | 0.3145 | ... | 0.7756 |

331, 332

F I G. 11

STORAGE UNIT — 22, 31

| GENERATION DATA | TEMPERATURE | C | M | Y | K | 380[nm] | 390[nm] | ... | 780[nm] |
|---|---|---|---|---|---|---|---|---|---|
| PATCH | $T_t$ | 0 | 0 | 10 | 0 | 0.0358 | 0.0365 | ... | 0.7278 |
| | $T_t$ | 0 | 0 | 20 | 0 | 0.0297 | 0.0318 | ... | 0.5080 |
| | $T_t$ | 0 | 0 | 30 | 0 | 0.0258 | 0.0285 | ... | 0.5379 |
| | ⋮ | ⋮ | ⋮ | ⋮ | ⋮ | ⋮ | ⋮ | ⋮ | ⋮ |
| | $T_t$ | 100 | 100 | 90 | 100 | 0.0801 | 0.0882 | ... | 0.6761 |
| | $T_t$ | 100 | 100 | 100 | 100 | 0.0730 | 0.0808 | ... | 0.7622 |

312

PRESET COLORIMETRIC DATA — 33
MEDIUM 3
MEDIUM 2
MEDIUM 1 — TEMPERATURE

| | | C | M | Y | K | 380[nm] | 390[nm] | ... | 780[nm] |
|---|---|---|---|---|---|---|---|---|---|
| | $T_1$ | 0 | 0 | 10 | 0 | 0.0358 | 0.0365 | ... | 0.7278 |
| | $T_1$ | 0 | 0 | 20 | 0 | 0.0297 | 0.0318 | ... | 0.5080 |
| | $T_1$ | 0 | 0 | 30 | 0 | 0.0258 | 0.0285 | ... | 0.5379 |
| | ⋮ | ⋮ | ⋮ | ⋮ | ⋮ | ⋮ | ⋮ | ⋮ | ⋮ |
| | $T_1$ | 100 | 100 | 90 | 100 | 0.0801 | 0.0882 | ... | 0.6761 |
| | $T_1$ | 100 | 100 | 100 | 100 | 0.0730 | 0.0808 | ... | 0.7622 |
| | $T_2$ | 0 | 0 | 10 | 0 | 0.0591 | 0.0680 | ... | 0.1865 |
| | $T_2$ | 0 | 0 | 20 | 0 | 0.0383 | 0.0486 | ... | 0.2297 |
| | $T_2$ | 0 | 0 | 30 | 0 | 0.0232 | 0.0313 | ... | 0.2259 |
| | ⋮ | ⋮ | ⋮ | ⋮ | ⋮ | ⋮ | ⋮ | ⋮ | ⋮ |
| | $T_2$ | 100 | 100 | 90 | 100 | 0.0659 | 0.0734 | ... | 0.1863 |
| | $T_2$ | 100 | 100 | 100 | 100 | 0.0559 | 0.0644 | ... | 0.2275 |
| | $T_3$ | 0 | 0 | 10 | 0 | 0.0358 | 0.0457 | ... | 0.1886 |
| | $T_3$ | 0 | 0 | 20 | 0 | 0.0219 | 0.0297 | ... | 0.2134 |
| | $T_3$ | 0 | 0 | 30 | 0 | 0.0637 | 0.0669 | ... | 0.7730 |
| | ⋮ | ⋮ | ⋮ | ⋮ | ⋮ | ⋮ | ⋮ | ⋮ | ⋮ |
| | $T_3$ | 100 | 100 | 90 | 100 | 0.0448 | 0.0522 | ... | 0.3359 |
| | $T_3$ | 100 | 100 | 100 | 100 | 0.0327 | 0.0384 | ... | 0.3721 |

333, 334

IMAGE PROCESSING USING COLORIMETRIC VALUES

TECHNICAL FIELD

The present invention relates to an image processing apparatus and color processing method and, more particularly, to an image processing apparatus and color processing method, which correct image data based on the colorimetric values of patches.

BACKGROUND ART

A general printing apparatus uses a color conversion lookup table (to be abbreviated as LUT hereinafter) so as to output desired colors. The color conversion LUT includes an LUT used in calibration required to maintain a printing apparatus in a constant state, an LUT used in color matching represented by an ICC profile, and the like. In order to create such color conversion LUTs, a printing apparatus outputs patches of a plurality of colors, which are configured, as shown in, e.g., FIG. 9. Note that one square of a quadrille pattern corresponds to one patch, as denoted by reference numeral 91 in FIG. 9. By measuring these patches of a plurality of colors using a colorimeter such as a spectral colorimeter, colorimetric values are obtained, and a color conversion LUT is created by associating device-dependent values and device-independent values with each other.

Most of media used in printing contain a fluorescent whitening agent, which absorbs ultraviolet rays and emits fluorescence in the visible range (especially, in a blue-violet range) so as to increase the degree of whiteness. The fluorescent whitening effect by the fluorescent whitening agent increases/decreases depending on temperatures, as shown in FIG. 10. For this reason, the colorimetric values of printed materials output onto media including the fluorescent whitening agent also vary depending on temperatures. Variation amounts of the colorimetric values of printed materials due to the influence of the fluorescent whitening agent contained in media are largest on a medium white part, and decrease with increasing amounts of color materials such as ink and toner. That is, the variation amounts of the colorimetric values are large on a highlight part and low-saturation part where the human color perceptual sensitivity is high.

Hence, in order to manage the colors of a printing apparatus with high precision, the temperature at the time of measurement is required to be always maintained at a constant target temperature (for example, 23° C. as the standard temperature in the colorimetry field; JIS Z8703). However, this method is impractical in terms of cost. Hence, a method of predicting colorimetric values at a certain target temperature by correcting colorimetric value changes depending on temperatures is required.

As the method of correcting the colorimetric value changes depending on temperatures, the following methods are proposed.

In one method, spectral reflectance change amounts for respective wavelengths per unit temperature interval are calculated in advance for respective color samples, and the spectral reflectance at a desired temperature is predicted (for example, see patent reference 1).

In another method, change amounts of absorption coefficients and scattering coefficients in the Kubelka-Munk formula for respective wavelengths per unit temperature interval are calculated for respective color samples, and the spectral reflectance at a desired temperature is predicted (for example, see patent reference 2).

[Patent Reference 1] Japanese Patent No. 3776492
[Patent Reference 2] Japanese Patent No. 3555706

However, in the method which is described in patent reference 1 and calculates spectral reflectance change amounts for respective wavelengths per unit temperature interval, spectral reflectances for all combinations of device values that can be output by a printing apparatus cannot be predicted.

In the method which is described in patent reference 2 and calculates change amounts of absorption coefficients and scattering coefficients for respective wavelengths per unit temperature interval for respective color samples, the spectral reflectance of a mixed color can be predicted according to the mixing ratio of color samples. However, since a printed material that has undergone general halftoning has an uneven colored surface, it is also difficult for this method to predict spectral reflectances for all combinations of device values that can be output by a printing apparatus.

Since neither of the two methods consider the influence of a fluorescent whitening agent contained in substrates of color samples (printing media), they cannot appropriately correct colorimetric values for printed materials using media containing the fluorescent whitening agent.

DISCLOSURE OF INVENTION

The present invention has been made to solve the aforementioned problems, and provides an image processing apparatus and color processing method, which appropriately estimate the colorimetric values of a patch of an arbitrary color at a desired temperature with respect to a medium containing a fluorescent whitening agent.

According to an aspect of the invention an image processing apparatus of the present invention comprises the following arrangement.

That is, an image processing apparatus comprises: first medium colorimetric value acquisition means for acquiring a first medium colorimetric value obtained by measuring a medium containing a fluorescent whitening agent at a first temperature; second medium colorimetric value acquisition means for acquiring a second medium colorimetric value obtained by measuring the medium at a second temperature; patch colorimetric value acquisition means for acquiring reference patch calorimetric values obtained by measuring patches of a plurality of colors formed on the medium at the second temperature; target temperature acquisition means for acquiring a target temperature; medium colorimetric value estimation means for estimating, based on the first and second medium colorimetric values, a third medium colorimetric value obtained when the medium is measured at the target temperature; and patch calorimetric value estimation means for estimating, based on the second and third medium calorimetric values and the reference patch calorimetric values, patch colorimetric values obtained when the patches of the plurality of colors formed on the medium are measured at the target temperature.

According to another aspect of the invention, an image processing apparatus of the present invention comprises: holding means for holding first and second patch colorimetric values obtained by measuring patches of a plurality of colors formed on a medium containing a fluorescent whitening agent respectively at first and second temperatures; target temperature acquisition means for acquiring a target temperature; and patch colorimetric value estimation means for estimating, based on the first and second patch colorimetric values held in the holding means, patch colorimetric values obtained when the patches of the plurality of colors formed on the medium are measured at the target temperature.

For example, the second temperature is a temperature of a medium immediately after the patches of the plurality of colors are formed.

According to the present invention with the above arrangement, the colorimetric values of an arbitrary patch at a desired temperature with respect to a medium containing a fluorescent whitening agent can be appropriately estimated. Therefore, appropriate image correction can be applied to image data, whose image is to be formed.

Further features of the present invention will become apparent from the following description of exemplary embodiments with reference to the attached drawings.

BRIEF DESCRIPTION OF DRAWINGS

FIG. 3 is a view showing an example of data held in a storage unit according to this embodiment;

FIG. 11 is a view showing an example of data held in a storage unit according to the second embodiment.

BEST MODE FOR CARRYING OUT THE INVENTION

The present invention will be described in detail hereinafter by way of its preferred embodiments with reference to the accompanying drawings. Note that the arrangements described in the following embodiments are merely examples, and the present invention is not limited to the illustrated arrangements.

First Embodiment

This embodiment will explain colorimetric value temperature correction as a color processing method in an electrophotographic printer apparatus which mounts a color sensor. Assume that a medium handled in this embodiment contains a fluorescent whitening agent which absorbs ultraviolet rays and emits fluorescence in the visible range so as to increase the degree of whiteness. Also, assume that colorimetry of the medium and patches formed on the medium is done under a light source including the ultraviolet range. That is, various colorimetric values obtained in this embodiment include the influence of the fluorescent whitening agent.

Apparatus Arrangement

Figure 1:
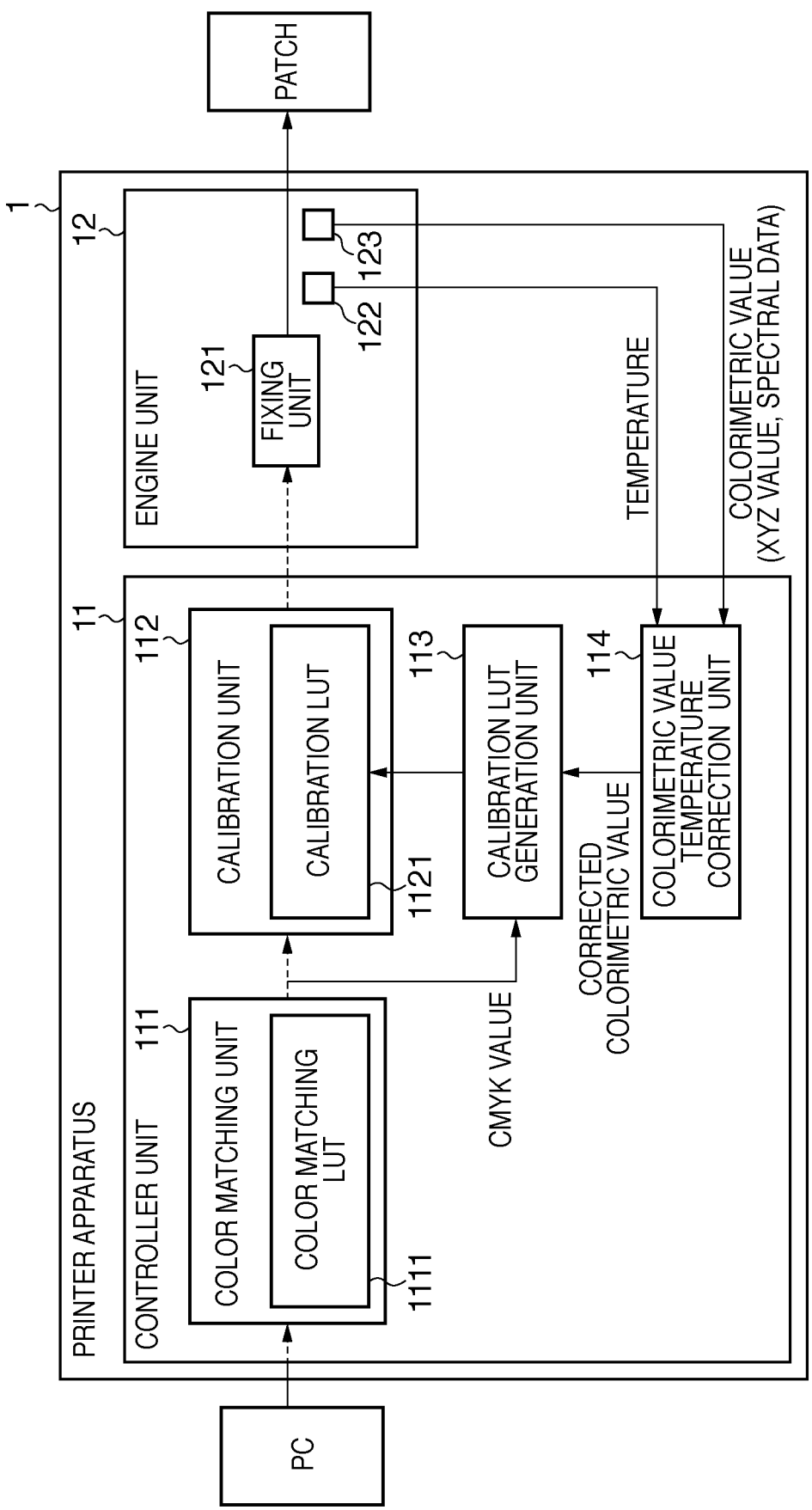
FIG. 1 is a block diagram showing the arrangement of a printer apparatus according to an embodiment of the present invention.

FIG. 1 is a block diagram showing the arrangement of a printer apparatus according to this embodiment. A printer apparatus 1 outputs patches for calibration before or during a print job, and measures the colorimetric values of these patches using a built-in colorimetry sensor. Then, the apparatus 1 creates and updates a correction table based on the colorimetric values, thus maintaining constant color reproducibility of the apparatus. At this time, the plurality of output patches for calibration have high temperatures immediately after fixing, and their colorimetric values vary. Hence, this embodiment is characterized by applying correction to these colorimetric values.

Functional units of the printer apparatus 1 are roughly classified into a controller unit 11 and engine unit 12. The controller unit 11 includes a color matching unit 111, calibration unit 112, calibration LUT generation unit 113, and colorimetric value temperature correction unit 114. Note that the controller unit 11 includes various other functional units associated with image processing, but a description of the units which do not directly relate to this embodiment will not be given.

The color matching unit 111 executes color adjustment using a color matching LUT 1111 represented by an ICC profile, by a CMM (Color Matching Module). The calibration unit 112 executes image correction (calibration) to maintain a constant print state using a calibration LUT 1121. That is, by converting image data (device values) CMYK, whose image is to be formed and which is output from the color matching unit 111, using the calibration LUT 1121, corrected CMYK values are obtained. Note that the conversion using the calibration LUT 1121 in this case may be done multi-dimensionally or one-dimensionally.

The colorimetric value temperature correction unit 114 estimates calorimetric values at a target temperature by correcting temperature variations of patch colorimetric values, as a characteristic feature of this embodiment.

The calibration LUT generation unit 113 generates the calibration LUT 1121 in the calibration unit 112 using the calorimetric values at the target temperature, which are corrected by the colorimetric value temperature correction unit 114.

On the other hand, the engine unit 12 includes a fixing unit 121, temperature sensor unit 122, and color sensor unit 123. Note that the engine unit 12 includes various other functional units used to form an image on a medium, but a description of the units which do not directly relate to this embodiment will not be given.

The fixing unit 121 includes a combination of rollers and a belt, incorporates a heat source such as a halogen heater, and melts and fixes toners attached on a medium by heat and pressure. The color sensor unit 123 is arranged on a convey path from the fixing unit 121 to a discharge port, and measures the colors of patches. The temperature sensor unit 122 is arranged in the vicinity of the color sensor unit 123, and measures the temperature of a medium at the time of patch colorimetry.

Figure 2:
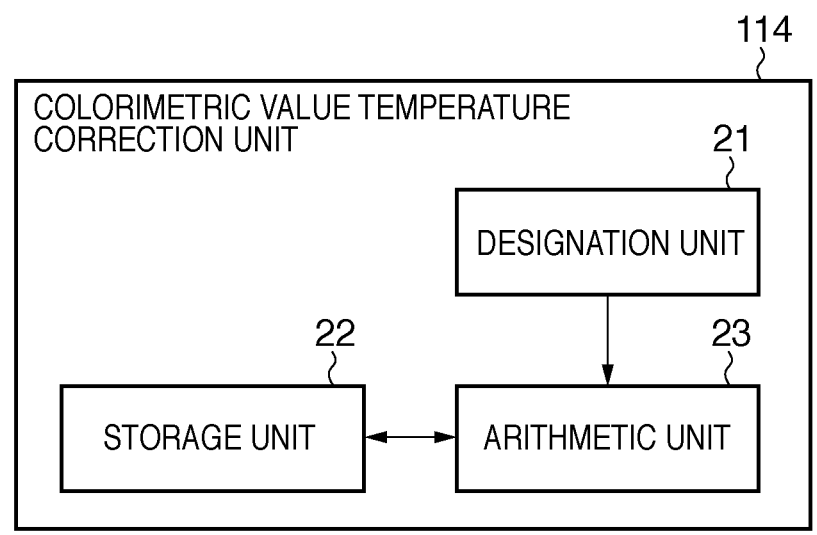
FIG. 2 is a block diagram showing the detailed arrangement of a colorimetric value temperature correction unit according to this embodiment.

The detailed arrangement of the colorimetric value temperature correction unit 114 will be described below. As shown in FIG. 2, the colorimetric value temperature correction unit 114 includes a designation unit 21, storage unit 22, and arithmetic unit 23.

Figure 4:
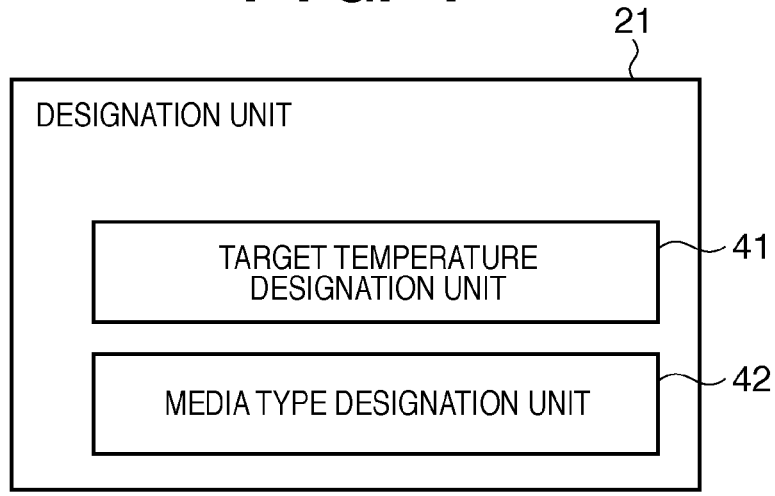
FIG. 4 is a block diagram showing the detailed arrangement of a designation unit according to this embodiment.
Figure 5:
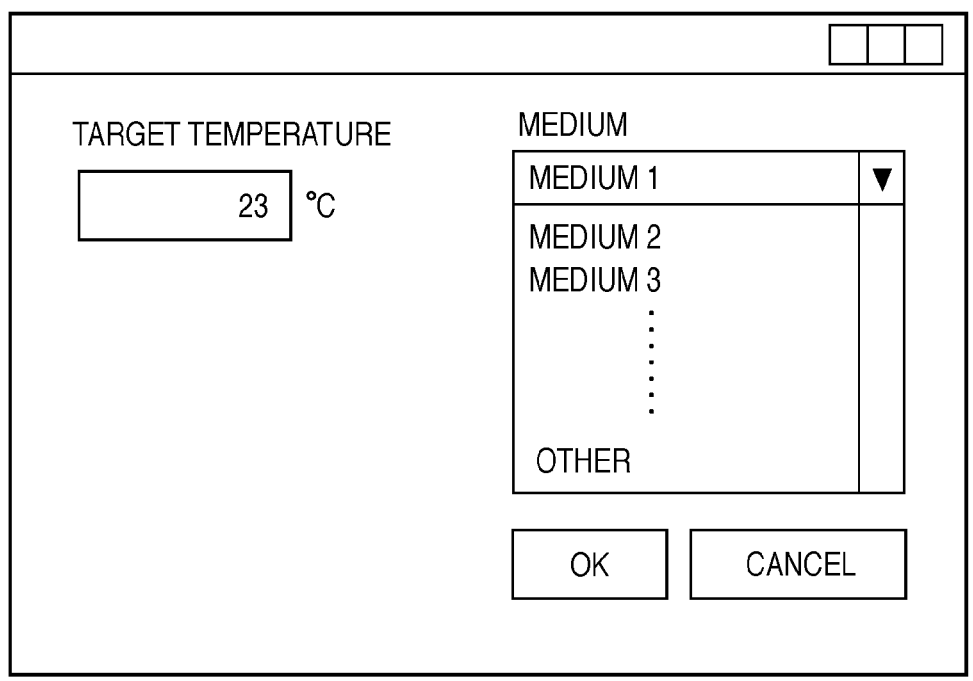
FIG. 5 is a view showing an example of a UI which implements the designation unit according to this embodiment.

As shown in FIG. 4, the designation unit 21 includes a target temperature designation unit 41 and media type designation unit 42. The target temperature designation unit 41 designates a desired target temperature based on a user instruction. As an example of the target temperature, 23° C. as the standard temperature in the colorimetry field (JIS Z8703) is used. The media type designation unit 42 designates a media type used upon outputting patches of a plurality of colors for calibration. The designation unit 21 is implemented by, for example, displaying a user interface (UI) shown in FIG. 5 on a PC or a front panel of a printer, so as to allow to designate the target temperature and media type according to user instructions.

As shown in FIG. 3, the storage unit 22 stores generation data 31, measured data 32, and preset colorimetric data 33. Each of these three types of data includes a temperature, CMYK values, and spectral reflectance values. The generation data 31 includes colorimetric values at a target temperature, which are generated by the colorimetric value temperature correction unit 114. The measured data 32 includes measured values acquired by the temperature sensor unit 122 and color sensor unit 123. The preset colorimetric data 33 includes medium white data of various media, which are measured in advance at a plurality of temperatures.

Note that the plurality of temperatures in the preset colorimetric data 33 include, for example, 23° C. as the standard temperature in the colorimetry field (JIS Z8703), a temperature immediately after fixing at the time of image formation in the printer apparatus 1, and so forth.

Calibration LUT Creation Processing

Figure 6:
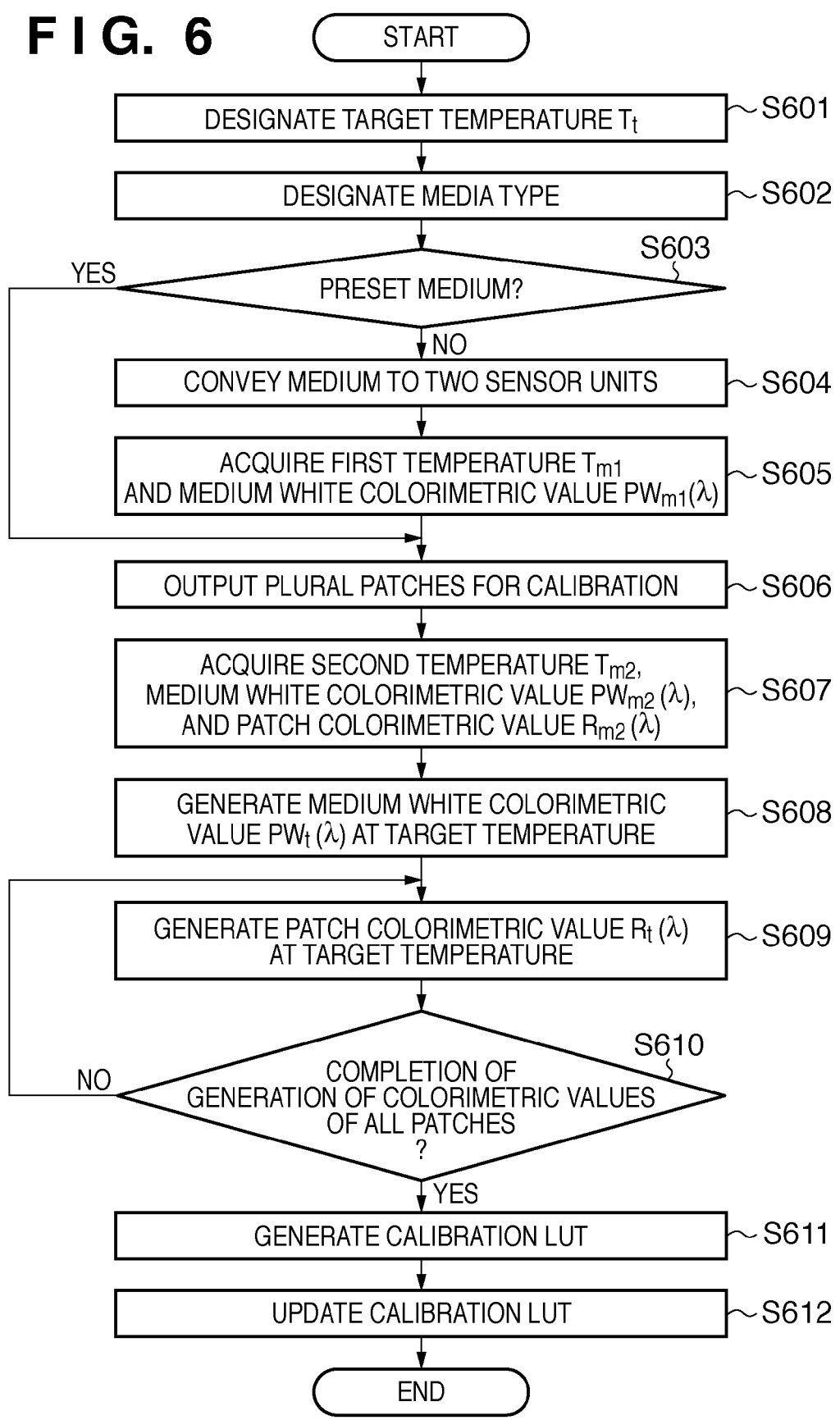
FIG. 6 is a flowchart showing calibration LUT creation processing according to this embodiment.

The generation processing of the calibration LUT 1121 in the printer apparatus 1 of this embodiment will be described below with reference to the flowchart of FIG. 6.

In step S601, the user designates a target temperature $T_t$ using the target temperature designation unit 41 in the colorimetric value temperature correction unit 114. In step S602, the user designates a medium used in calibration using the media type designation unit 42. The control conditionally branches by checking in step S603 whether or not the medium designated in step S602 is a preset medium, i.e., whether or not the designated medium is that stored as the preset colorimetric data 33 in the storage unit 22. That is, if the designated medium is a preset medium, the process jumps to step S606; otherwise, the process advances to step S604.

In step S604, the designated medium set on the printer apparatus 1 is conveyed to a position (measurement position) where the measurements by the temperature sensor unit 122 and color sensor unit 123 can be made. In step S605, the temperature sensor unit 122 measures a first temperature $T_{m1}$ as the medium temperature, and the color sensor unit 123 acquires medium white colorimetric values $PW_{m1}(\lambda)$ on the medium. The first temperature and medium white colorimetric values acquired in this step are stored as first medium colorimetric values 321 in the measured data 32 in the storage unit 22. This first temperature $T_{m1}$ is not high (it is low) since it is not influenced by heat of the fixing unit 121.

In step S606, patch data of a plurality of colors for calibration are formed on the medium based on, for example, data output from a PC, and that medium is conveyed to the measurement position of the sensors.

In step S607, the temperature sensor unit 122 measures a second temperature $T_{m2}$ as a temperature immediately after patch formation. Also, the color sensor unit 123 acquires medium white colorimetric values $PW_{m2}(\lambda)$ and patch colorimetric values $R_{m2}(\lambda)$ on the medium immediately after patch formation. In case of a preset medium, the second temperature and medium white colorimetric values need not be measured in this step. The second temperature $T_{m2}$ and medium white colorimetric values $PW_{m2}(\lambda)$ acquired in this step are stored as second medium colorimetric values 322 in the measured data 32 in the storage unit 22. Likewise, the patch colorimetric values $R_{m2}(\lambda)$ are stored as reference patch colorimetric values 323. This second temperature $T_{m2}$ is high since it is influenced by heat of the fixing unit 121.

In step S608, the arithmetic unit 23 generates third medium colorimetric values $PW_t(\lambda)$ as medium white colorimetric values at the target temperature $T_t$. Then, the arithmetic unit 23 stores the third medium calorimetric values $PW_t(\lambda)$ as medium colorimetric values 311 in the generation data 31 in the storage unit 22. The third medium colorimetric values $PW_t(\lambda)$ estimate calorimetric values which will be obtained when the designated medium is measured at the target temperature. This estimation arithmetic operation is made under the assumption that medium white calorimetric values linearly change as the temperature changes in this embodiment. More specifically, the following formulas are used depending on whether or not the designated medium is a preset medium.

When the designated medium is a preset medium, formula (1) below is used:

$$PW_t(\lambda) = PW_1(\lambda) + (PW_2(\lambda) - PW_1(\lambda)) \times \frac{T_t - T_1}{T_2 - T_1} \quad (1)$$

As parameters in formula (1), first and second medium calorimetric values 331 and 332, which are held as the preset calorimetric data 33 in the storage unit 22, are used. More specifically, a first temperature $T_1$, second temperature $T_2$, medium white spectral reflectances $PW_1(\lambda)$ at the first temperature, and medium white spectral reflectances $PW_2(\lambda)$ at the second temperature are used.

On the other hand, when the designated medium is not a preset medium, formula (2) below is used:

$$PW_t(\lambda) = PW_{m1}(\lambda) + (PW_{m2}(\lambda) - PW_{m1}(\lambda)) \times \frac{T_t - T_{m1}}{T_{m2} - T_{m1}} \quad (2)$$

As parameters in formula (2), the first and second medium colorimetric values 321 and 322 (measured values in steps S605 and S607), which are held as the measured data 32 in the storage unit 22, are used. That is, the first temperature $T_{m1}$ and medium white spectral reflectances $PW_{m1}(\lambda)$ at the first temperature as the first medium calorimetric values 321 are used. Also, the second temperature $T_{m2}$ and medium white spectral reflectances $PW_{m2}(\lambda)$ at the second temperature as the second medium calorimetric values 322 are used.

Even when the designated medium is a preset medium, the colorimetric values in step S607 may be applied as the second temperature and second medium colorimetric values at that temperature. In this case, a calculation formula of the third medium colorimetric values at the target temperature is obtained by modifying formula (1) above. That is, $T_2$ and $PW_2(\lambda)$ in formula (1) are respectively replaced by $T_{m2}$ and $PW_{m2}(\lambda)$.

In step S609, the arithmetic unit 23 generates patch calorimetric values $R_t(\lambda)$ at the target temperature $T_t$ using the third medium colorimetric values $PW_t(\lambda)$ calculated, as described above. The patch colorimetric values $R_t(\lambda)$ generated in this step are sequentially stored as patch colorimetric values 312 in the generation data 31 in the storage unit 22. The patch calorimetric values $R_t(\lambda)$ colorimetric estimate values which will be obtained when the patches formed on the designated medium are measured at the target temperature. As this estimation arithmetic operation, for example, formula (3) below is used:

$$R_t(\lambda) = R_{m2}(\lambda) \times \frac{PW_t(\lambda)}{PW_{m2}(\lambda)} \quad (3)$$

As parameters in formula (3), the second medium colorimetric values 322 and reference patch colorimetric values 323 (measured values in step S607), which are held as the measured data 32 in the storage unit 22, are used. That is, medium white spectral reflectances $PW_{m2}(\lambda)$ and patch spectral reflectances $R_{m2}(\lambda)$ at the second temperature are used.

In step S610, the generation processing of patch colorimetric values at the target temperature in step S609 is repeated for all the patches.

Upon completion of generation of the patch colorimetric values at the target temperature for all the patches, a calibration LUT 1121 is created in step S611. More specifically, the calibration LUT generation unit 113 creates a new calibration LUT 1121 based on the patch colorimetric values 312 of a plurality of colors at the target temperature stored in the generation data 31 in the storage unit 22. In step S612, the calibration unit 112 is updated by the new calibration LUT 1121.

As described above, according to this embodiment, the medium colorimetric values at the first and second temperatures are acquired in association with a medium containing a fluorescent whitening agent, and the reference patch colorimetric values at the second temperature are acquired in association with patches of a plurality of colors formed on that medium. Then, patch colorimetric values which will be obtained upon measuring the patches formed on the medium at a desired target temperature are estimated based on these acquired medium colorimetric values and reference patch colorimetric values. Since the colorimetric values of this embodiment reflect the influence of the fluorescent whitening agent contained in the medium, the state of the printer apparatus can be maintained with high precision by updating the calibration LUT based on the estimated patch colorimetric values.

Second Embodiment

The second embodiment according to the present invention will be described below. In the second embodiment as well, colorimetric value temperature correction in an electrophotographic printer apparatus which mounts a color sensor is executed as in the first embodiment.

Apparatus Arrangement

Figure 7:
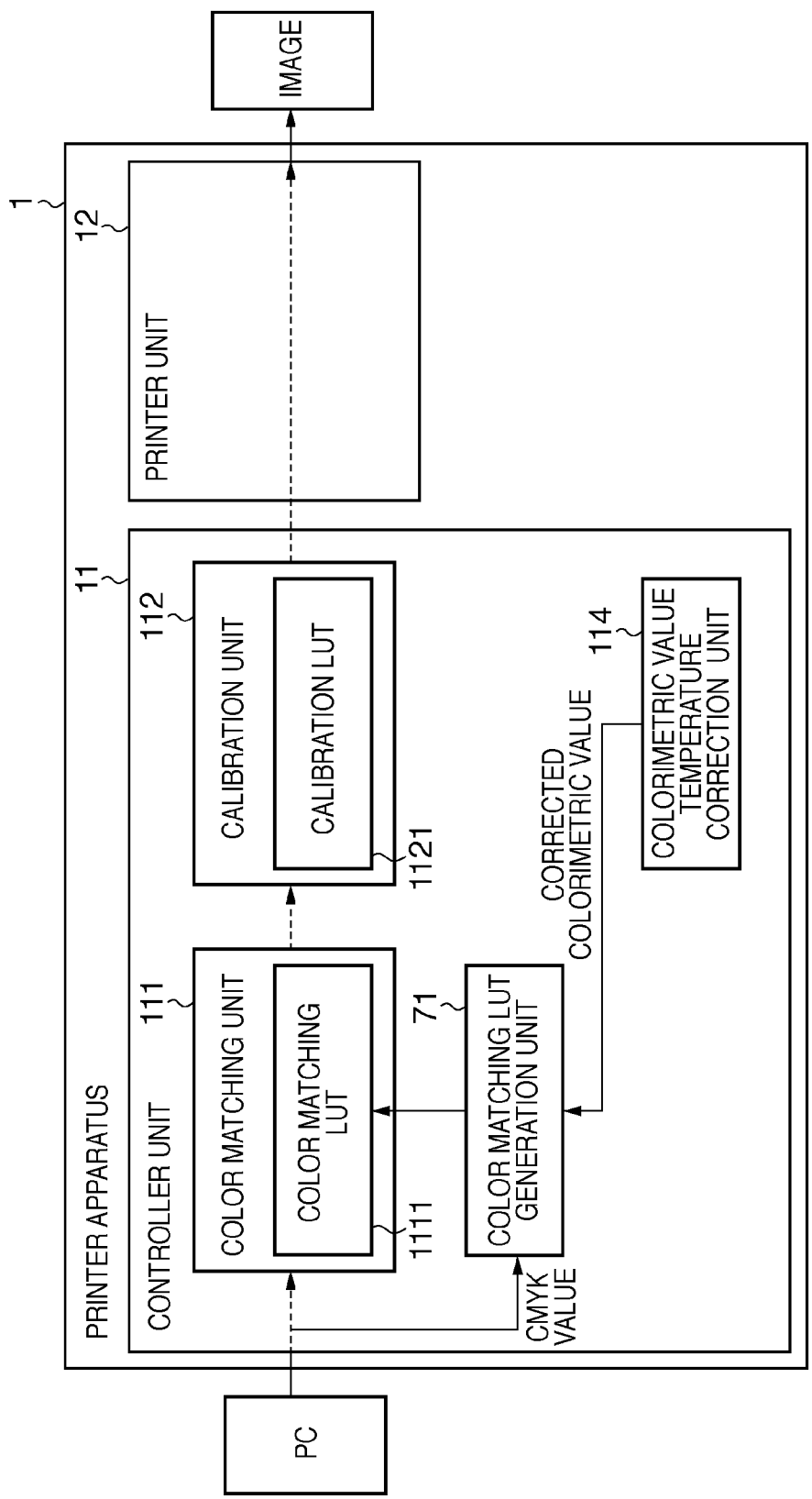
FIG. 7 is a block diagram showing the arrangement of a printer apparatus according to the second embodiment.

FIG. 7 is a block diagram showing the arrangement of a printer apparatus according to the second embodiment. In FIG. 7, the same reference numerals denote the same components as in the arrangement shown in FIG. 1 of the first embodiment. A printer apparatus 2 shown in FIG. 7 holds colorimetric values obtained by measuring patches of a plurality of colors at a plurality of temperatures in advance. By generating and updating a color matching LUT at an arbitrary target temperature based on the colorimetric values, high-precision color matching at the arbitrary target temperature is implemented.

Functional units of the printer apparatus 2 are roughly classified into a controller unit 11 and engine unit 12. The controller unit 11 includes a color matching unit 111, calibration unit 112, color matching LUT generation unit 71, and colorimetric value temperature correction unit 114. Note that the controller unit 11 includes various other functional units associated with image processing, but a description of the units which do not directly relate to this embodiment will not be given.

The color matching unit 111 executes color adjustment using a color matching LUT 1111 represented by an ICC profile, by a CMM (Color Matching Module). The calibration unit 112 executes image correction (calibration) to maintain a constant print state using a calibration LUT 1121.

The colorimetric value temperature correction unit 114 generates colorimetric values at a target temperature by executing temperature correction of the calorimetric values which are measured in advance using a target temperature and media type designated by a designation unit 21.

The color matching LUT generation unit 71 generates the color matching LUT 1111 in the color matching unit 111 using the colorimetric values at the target temperature, which are corrected by the colorimetric value temperature correction unit 114.

Note that the engine unit 12 performs image formation based on output values from the controller unit 11, but it is not particularly involved in the color matching LUT creation processing in the second embodiment.

The detailed arrangement of the colorimetric value temperature correction unit 114 will be described below. The colorimetric value temperature correction unit 114 includes the designation unit 21, a storage unit 22, and an arithmetic unit 23, as shown in FIG. 2.

As shown in FIG. 4, the designation unit 21 includes a target temperature designation unit 41 and media type designation unit 42. The target temperature designation unit 41 allows the user to designate a desired target temperature. As the target temperature, for example, when the user observes an output image outdoors in a cold region, he or she designates an ambient temperature (e.g., 0° C.) at that time. The media type designation unit 42 designates a media type used upon outputting an image. The designation unit 21 is implemented by, for example, displaying a user interface (UI) shown in FIG. 5 on a PC or a front panel of a printer, so as to allow to designate the target temperature and media type according to user instructions.

The storage unit 22 of the second embodiment stores generation data 31 and preset colorimetric data 33 for patches, as shown in FIG. 11. Each of these two types of data includes a temperature, CMYK values, and spectral reflectance values. The generation data 31 includes colorimetric values at a target temperature, which are generated by the colorimetric value temperature correction unit 114, as in the first embodiment. The preset colorimetric data 33 includes data obtained by measuring patches of a plurality of colors output onto various media at a plurality of temperatures.

Color Matching LUT Creation Processing

Figure 8:
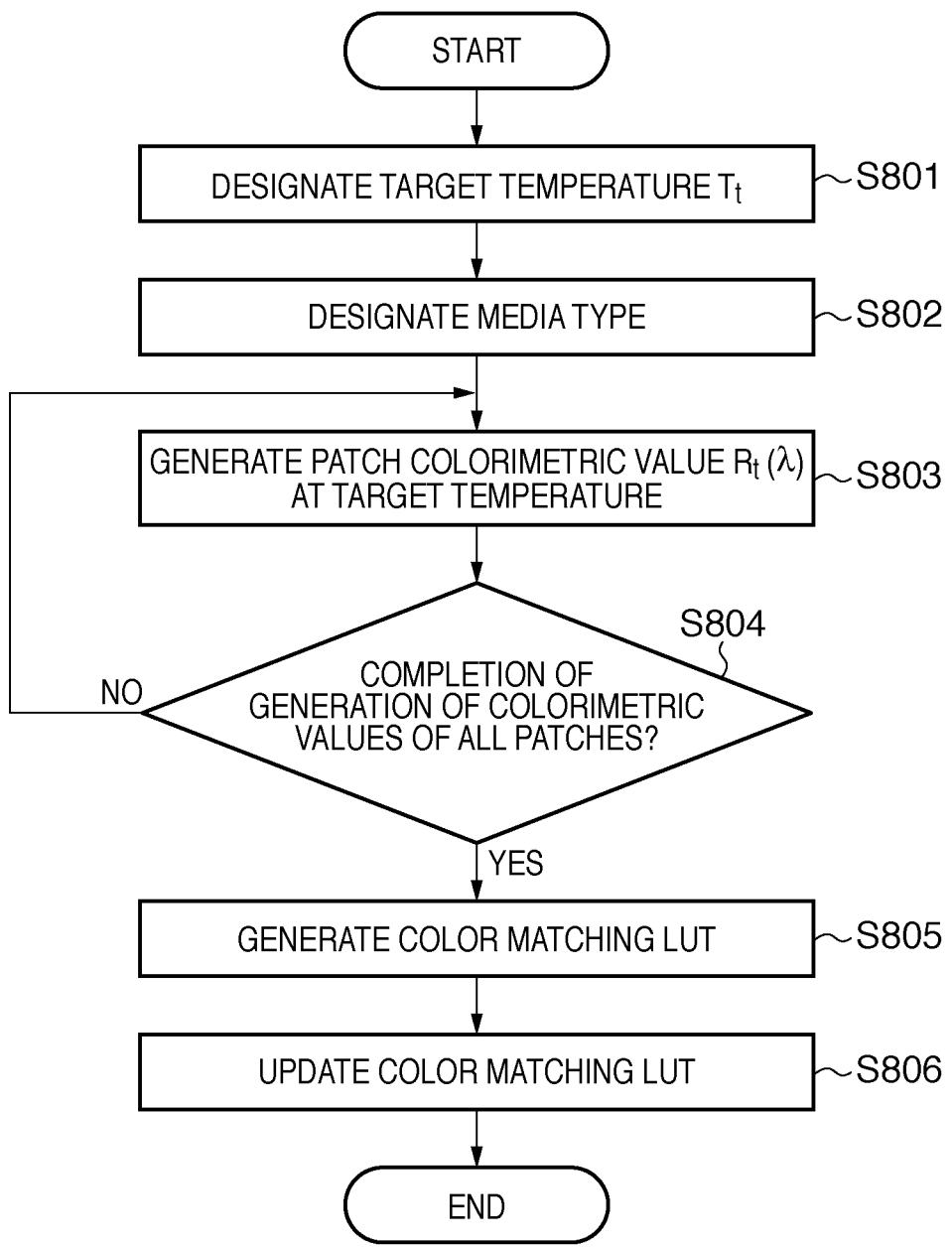
FIG. 8 is a flowchart showing color matching LUT creation processing according to the second embodiment.
Figure 9:
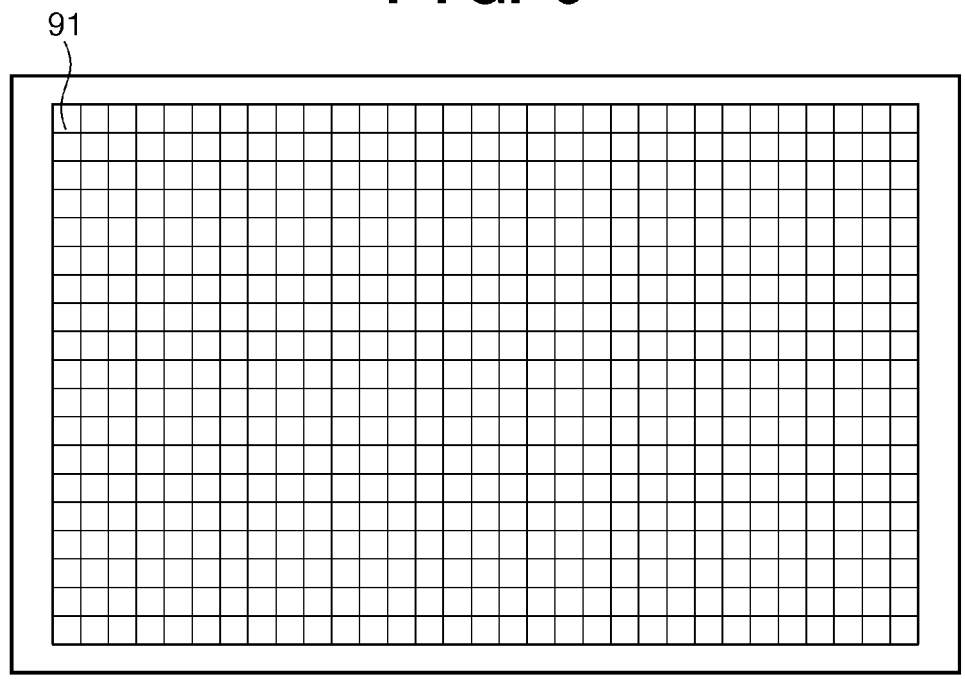
FIG. 9 is a view showing an example of general patches.
Figure 10:
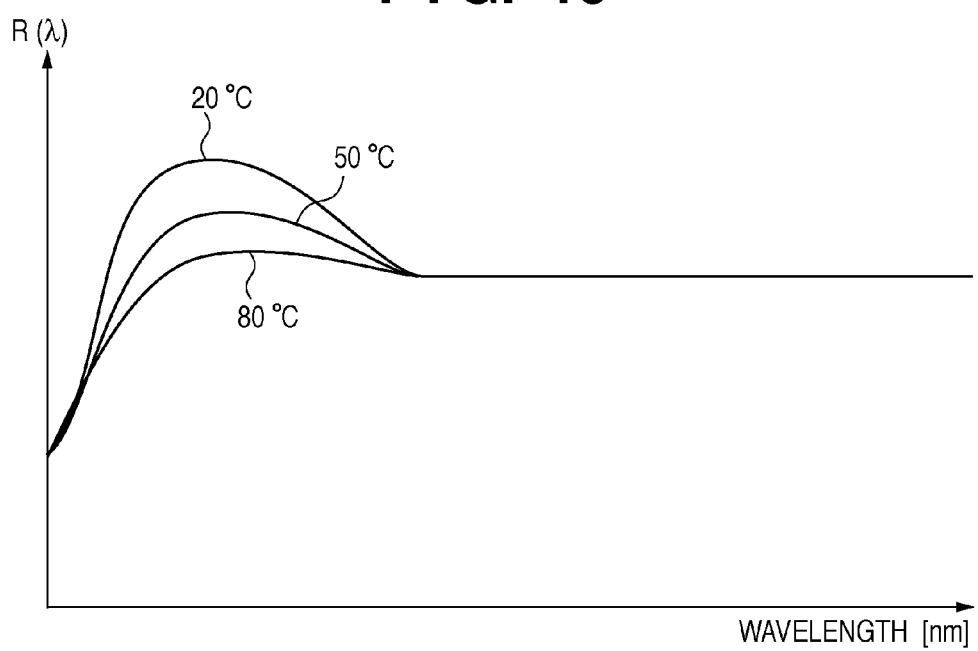
FIG. 10 is a graph showing the medium white spectral reflectances at a plurality of temperatures.

The generation processing of the color matching LUT 1111 in the printer apparatus 2 of the second embodiment will be described below with reference to the flowchart of FIG. 8.

In step S801, the user designates a target temperature $T_t$ using the target temperature designation unit 41 in the colorimetric value temperature correction unit 114. In step S802, the user designates a medium used upon outputting an image using the media type designation unit 42.

In step S803, the arithmetic unit 23 generates patch colorimetric values $R_t(\lambda)$ at the target temperature $T_t$, and sequentially stores them as patch colorimetric values 312 in the generation data 31 in the storage unit 22. As this arithmetic operation method, for example, formula (4) below is used:

$$R_t(\lambda) = R_1(\lambda) + (R_2(\lambda) - R_1(\lambda)) \times \frac{T_t - T_1}{T_2 - T_1} \quad (4)$$

As parameters in formula (4), first and second patch colorimetric values 333 and 334, which are held as the preset colorimetric data 33 shown in FIG. 11 in the storage unit 22, are used. That is, a first temperature $T_1$, second temperature $T_2$, patch spectral reflectances $R_1(\lambda)$ at the first temperature, and patch spectral reflectances $R_2(\lambda)$ at the second temperature are used.

In step S804, the generation processing of the patch colorimetric values at the target temperature in step S803 is repeated for all the patches.

Upon completion of generation of the patch colorimetric values at the target temperature for all the patches, a color matching LUT 1111 is created in step S805. More specifically, the color matching LUT generation unit 71 creates a new color matching LUT 1111 based on the plurality of colors of patch colorimetric values 312 at the target temperature, which are stored in the generation data 31 in the storage unit 22. In step S806, the color matching unit 111 is updated by the new color matching LUT 1111.

As described above, according to the second embodiment, colorimetric values obtained by measuring patches of a plurality of colors at a plurality of temperatures in advance with respect to a medium containing a fluorescent whitening agent are held, and a color matching LUT at a desired target temperature is generated based on the colorimetric values. Then, high-precision color matching at an arbitrary target temperature can be implemented for that medium.

Note that the first and second embodiments have exemplified the colorimetric value correction in the electrophotographic printer apparatus. However, the present invention is applicable to printing apparatuses of other systems, as a matter of course.

The first and second embodiments have exemplified spectral reflectances used as colorimetric values, but XYZ values or values on other color spaces may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-257787, filed Oct. 2, 2008, which is hereby incorporated by reference in its entirety.

The invention claimed is:

1. An image processing apparatus comprising:
a first medium colorimetric value acquisition unit, configured to acquire a first medium colorimetric value obtained by measuring under a light including an ultraviolet part a medium containing a fluorescent whitening agent at a first temperature which is a temperature other than a temperature immediately after image formation;
a second medium colorimetric value acquisition unit, configured to acquire a second medium colorimetric value obtained by measuring under a light including an ultraviolet part the medium at a second temperature which is a temperature immediately after image formation;
a patch colorimetric value acquisition unit, configured to acquire reference patch colorimetric values obtained by measuring under a light including an ultraviolet part patches of a plurality of colors formed on the medium at the second temperature;
a target temperature acquisition unit, configured to acquire a target temperature;
a medium colorimetric value estimation unit, configured to estimate, based on the first and second medium colorimetric values, a third medium colorimetric value obtained when the medium is measured at the target temperature under a light including an ultraviolet part; and
a patch colorimetric value estimation unit, configured to estimate, based on the second and third medium colorimetric values and the reference patch colorimetric values, patch colorimetric values obtained when the patches of the plurality of colors formed on the medium are measured at the target temperature under a light including an ultraviolet part.

2. The apparatus according to claim 1, wherein the second temperature is a temperature of the medium immediately after the patches of the plurality of colors are formed.

3. The apparatus according to claim 1, further comprising:
a holding unit, configured to hold, the first medium colorimetric value in advance,
wherein the first medium colorimetric value acquisition unit acquires the first medium colorimetric value held in the holding unit.

4. The apparatus according to claim 3, further comprising:
a media type acquisition nit, configured to acquire, a type of the medium,
wherein the first medium colorimetric value acquisition unit acquires the first medium colorimetric value held in the holding unit according to the type of the medium acquired by the media type acquisition unit.

5. The apparatus according to claim 3, wherein the holding unit further holds the second medium colorimetric value, and
the second medium colorimetric value acquisition unit acquires the second medium colorimetric value held in the holding unit.

6. The apparatus according to claim 1, wherein the target temperature acquisition unit acquires the target temperature based on a user instruction.

7. The apparatus according to claim 1, wherein the first and second medium colorimetric values and the reference patch colorimetric values are values measured under a light source including an ultraviolet range.

8. An image processing apparatus comprising:
a holding unit, configured to hold, first and second patch colorimetric values obtained by measuring under a light including an ultraviolet part patches of a plurality of colors formed on a medium containing a fluorescent whitening agent respectively at first and second temperatures, wherein the first temperature is a temperature other than a temperature immediately after image formation and the second temperature is a temperature immediately after image formation;
a target temperature acquisition unit, configured to acquire a target temperature; and
a patch colorimetric value estimation unit, configured to estimate, based on the first and second patch colorimetric values held in the holding unit, patch colorimetric values obtained when the patches of the plurality of colors formed on the medium are measured at the target temperature under a light including an ultraviolet part.

9. The apparatus according to claim 1 further comprising:
an image correction unit, configured to correct image data, whose image is to be formed, based on the patch colorimetric values estimated by the patch colorimetric value estimation unit.

10. The apparatus according to claim 9, wherein the image correction unit creates a correction table based on the patch colorimetric values estimated by the patch colorimetric value estimation unit, and corrects the image data based on the correction table.

11. A color processing method comprising:
a first medium colorimetric value acquisition step of acquiring a first medium colorimetric value obtained by measuring under a light including an ultraviolet part a medium containing a fluorescent whitening agent at a first temperature which is a temperature other than a temperature immediately after image formation;
a second medium colorimetric value acquisition step of acquiring a second medium colorimetric value obtained by measuring under a light including an ultraviolet part the medium at a second temperature which is a temperature immediately after image formation;
a patch colorimetric value acquisition step of acquiring reference patch colorimetric values obtained by measuring under a light including an ultraviolet part patches of a plurality of colors formed on the medium at the second temperature;
a target temperature acquisition step of acquiring a target temperature;
a medium colorimetric value estimation step of estimating, based on the first and second medium colorimetric values, a third medium colorimetric value obtained when the medium is measured at the target temperature under a light including an ultraviolet part; and
a patch colorimetric value estimation step of estimating, based on the second and third medium colorimetric values and the reference patch colorimetric values, patch colorimetric values obtained when the patches of the plurality of colors formed on the medium are measured at the target temperature under a light including an ultraviolet part.

12. A color processing method in an image processing apparatus which holds, in holding means, first and second patch colorimetric values obtained by measuring under a light including an ultraviolet part patches of a plurality of colors formed on a medium containing a fluorescent whitening agent respectively at first and second temperatures, wherein the first temperature is a temperature other than a temperature immediately after image formation and the second temperature is a temperature immediately after image formation, the method comprising:
a target temperature acquisition step of acquiring a target temperature; and
a patch colorimetric value estimation step of estimating, based on the first and second patch colorimetric values held in the holding means, patch colorimetric values obtained when the patches of the plurality of colors formed on the medium are measured at the target temperature under a light including an ultraviolet part.

13. A non-transitory computer readable medium storing a program for making a computer execute a color processing method the method comprising:
a first medium colorimetric value acquisition step of acquiring a first medium colorimetric value obtained by measuring under a light including an ultraviolet part a medium containing a fluorescent whitening agent at a first temperature which is a temperature other than a temperature immediately after image formation;
a second medium colorimetric value acquisition step of acquiring a second medium colorimetric value obtained by measuring under a light including an ultraviolet part the medium at a second temperature which is a temperature immediately after image formation;
a patch colorimetric value acquisition step of acquiring reference patch colorimetric values obtained by measuring under a light including an ultraviolet part patches of a plurality of colors formed on the medium at the second temperature;
a target temperature acquisition step of acquiring a target temperature;
a medium colorimetric value estimation step of estimating, based on the first and second medium colorimetric values, a third medium colorimetric value obtained when the medium is measured at the target temperature under a light including an ultraviolet part; and
a patch colorimetric value estimation step of estimating, based on the second and third medium colorimetric values and the reference patch colorimetric values, patch colorimetric values obtained when the patches of the plurality of colors formed on the medium are measured at the target temperature under a light including an ultraviolet part.

14. A non-transitory computer-readable medium storing a program for making a computer execute a color processing method, the computer holding, in holding means, first and second patch colorimetric values obtained by measuring under a light including an ultraviolet part patches of a plurality of colors formed on a medium containing a fluorescent whitening agent respectively at first and second temperatures, wherein the first temperature is a temperature other than a temperature immediately after image formation and the second temperature is a temperature immediately after image formation, the method comprising:
a target temperature acquisition step of acquiring a target temperature; and
a patch colorimetric value estimation step of estimating, based on the first and second patch colorimetric values held in the holding means, patch colorimetric values obtained when the patches of the plurality of colors formed on the medium are measured at the target temperature under a light including an ultraviolet part.

15. The apparatus according to claim 8, further comprising:
an image correction unit, configured to correct image data, whose image is to be formed, based on the patch colorimetric values estimated by the patch colorimetric value estimation unit.

* * * * *